US011853046B2

United States Patent
Alkkiomäki et al.

(10) Patent No.: US 11,853,046 B2
(45) Date of Patent: Dec. 26, 2023

(54) PREDICTION OF FAULTY BEHAVIOUR OF A CONVERTER BASED ON TEMPERATURE ESTIMATION WITH MACHINE LEARNING ALGORITHM

(71) Applicant: ABB Schweiz AG, Baden (CH)

(72) Inventors: Olli Alkkiomäki, Helsinki (FI); Joni Siimesjärvi, Helsinki (FI); Ville Särkimäki, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/772,553

(22) PCT Filed: Oct. 15, 2020

(86) PCT No.: PCT/EP2020/079129
§ 371 (c)(1),
(2) Date: Apr. 28, 2022

(87) PCT Pub. No.: WO2021/089298
PCT Pub. Date: May 14, 2021

(65) Prior Publication Data
US 2022/0382269 A1    Dec. 1, 2022

(30) Foreign Application Priority Data

Nov. 7, 2019   (EP) ..................................... 19207584

(51) Int. Cl.
*G05B 23/02*    (2006.01)
(52) U.S. Cl.
CPC ....... *G05B 23/0229* (2013.01); *G05B 23/024* (2013.01); *G05B 23/0283* (2013.01)
(58) Field of Classification Search
CPC ...... G05B 2219/14043; G05B 23/0283; G05B 23/024; G05B 2219/25255; G05B 23/0229
See application file for complete search history.

(56) References Cited

U.S. PATENT DOCUMENTS

| | | | | |
|---|---|---|---|---|
| 9,595,908 B2* | 3/2017 | Odaka | ..................... | H02P 29/68 |
| 2003/0011348 A1* | 1/2003 | Lof | ......................... | F03D 9/255 |
| | | | | 322/37 |
| 2016/0377488 A1* | 12/2016 | Sjoroos | ................. | H03K 17/18 |
| | | | | 374/163 |

FOREIGN PATENT DOCUMENTS

| | | |
|---|---|---|
| AU | 2013260082 A1 | 11/2014 |
| CN | 109101738 A | 12/2018 |

(Continued)

OTHER PUBLICATIONS

Qing He et al. "Prediction of Top-Oil Temperature for Transformers Using Neural Networks", IEEE Transactions on Power Delivery, vol. 15, No. 4, Oct. 1, 2000, XP011049941, ISSN: 0885-8977.

(Continued)

*Primary Examiner* — Mischita L Henson
(74) *Attorney, Agent, or Firm* — Armstrong Teasdale LLP

(57) ABSTRACT

Disclosed herein is a method for predicting a faulty behaviour of an electrical converter. The method includes receiving an operation point indicator of the electrical converter indicative of an actual operation point of the electrical converter, where the electrical converter is connected to a rotating electrical machine; receiving a measured device temperature of a power semiconductor device of the electrical converter indicative of an actual temperature of the power semiconductor device; inputting the operation point indicator as input data into a machine learning algorithm trained with historical data comprising operation point indicators and associated device temperatures, where the historical data was recorded during normal operation of a power semiconductor device; estimating an estimated device temperature with the machine learning algorithm, where the estimated device temperature represents a device temperature during a normal operation; and predicting the (Continued)

faulty behaviour by comparing the estimated device temperature with the measured device temperature.

13 Claims, 6 Drawing Sheets

(56) References Cited

FOREIGN PATENT DOCUMENTS

| EP | 2527942 A2 * | 11/2012 | ............ F03D 17/00 |
|---|---|---|---|
| EP | 2600510 A1 | 6/2013 | |
| EP | 2941674 A2 | 11/2015 | |
| WO | 2018186467 A1 | 10/2018 | |

OTHER PUBLICATIONS

International Search Report and Written Opinion, dated Dec. 8, 2020, for International application No. PCT/EP2020/079129.

* cited by examiner

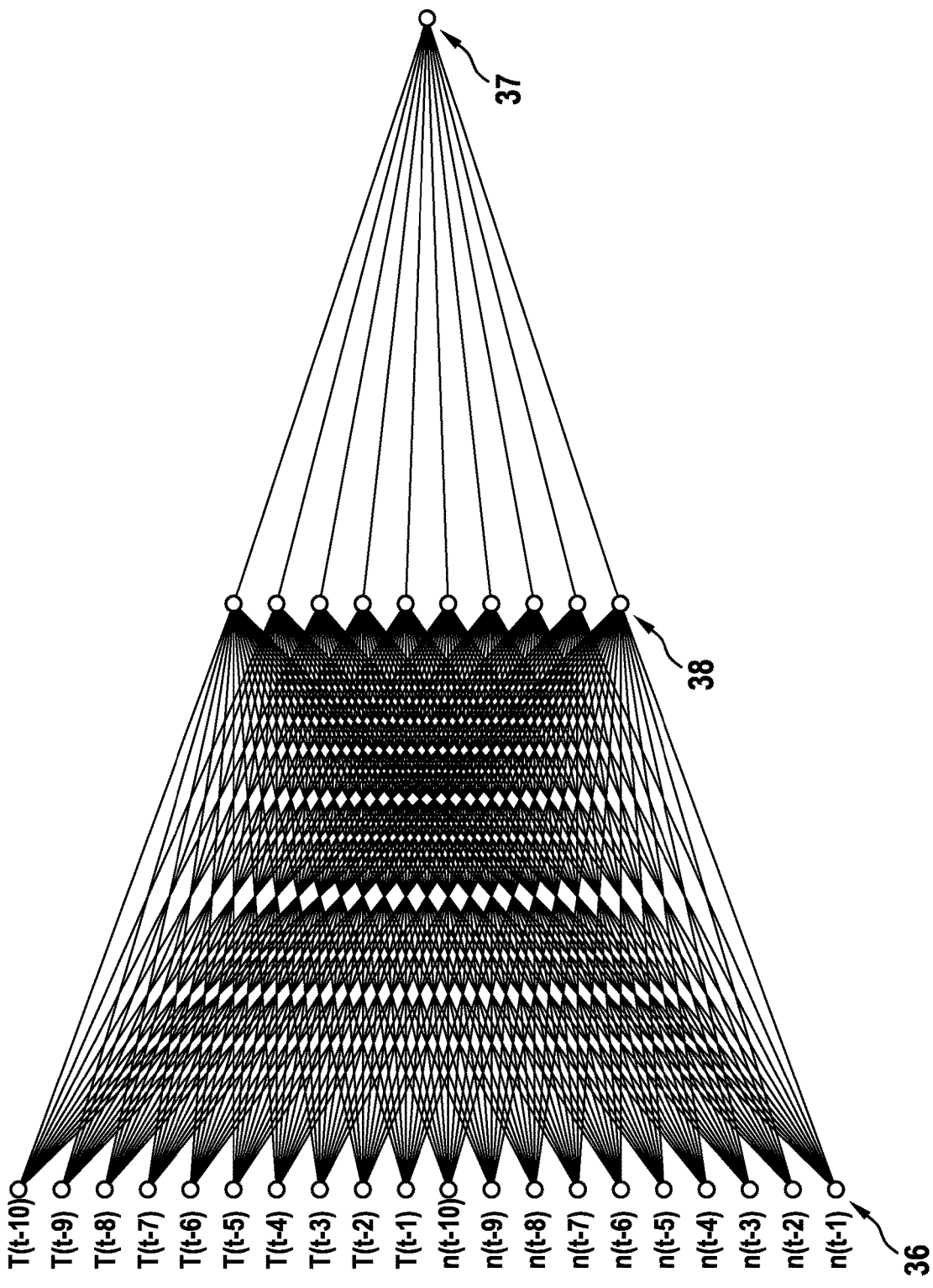

PREDICTION OF FAULTY BEHAVIOUR OF A CONVERTER BASED ON TEMPERATURE ESTIMATION WITH MACHINE LEARNING ALGORITHM

CROSS-REFERENCE TO RELATED APPLICATIONS

The present application is a National Stage Entry of International Application No. PCT/EP2020/079129, filed on Oct. 15, 2020, which claims the benefit of priority to European Patent Application No. 19207584.4, filed on Nov. 7, 2019, the entire contents of which are incorporated by reference in their entirety herein.

BACKGROUND

The present disclosure relates to the field of predictive maintenance of power semiconductor devices. In particular, the present disclosure relates to a method, a computer program, a computer-readable medium and a controller for predicting a faulty behaviour of an electrical converter. Furthermore, the present disclosure relates to a converter with such a controller.

The case temperature or module temperature of power semiconductor devices such as IGBTs can be directly measured, for example with a temperature sensor integrated into the semiconductor module housing the semiconductor device. However, aside from overtemperature, hardly anything meaningful may be gained from the measured temperature. Usually, it is difficult to see increases in a general temperature trend, such as higher temperature in same conditions as before, as the operation point and conditions of the system, in which the power semiconductor devices are used, can vary.

On the other hand, temperature trending is a simple way to monitor static conditions of a power semiconductor device. Sudden rises may be seen as component faults or aging (for example due to increased resistance), malfunctioning cooling (which may have a failure or is blocked) or increased ambient temperature (which may cause accelerated aging). However, when temperature varies a lot in short time due to a dynamic operating point and cyclic component usage, this type of simple trending is not often applicable, since it may be difficult to notice meaningful changes that happen slowly over time, such as a higher maximum temperature or a slower cooldown.

CN 109 101 738 A describes a method for estimating the aging degree of an IBGT module. The method includes a step of training an artificial neural network with measured electrothermal characteristic data of the IGBT module, such as a current, voltage or temperature. In further steps, actual measured electrothermal characteristic data are input into the trained artificial neural network and an aging degree evaluation result is output, which may be a number of aging cycles or aging levels.

EP 2 941 674 A2 describes a method for predicting an oil temperature of a transformer for a desired load based on a profile of the transformer. The profile is based on a machine learning algorithm that has been trained with historical data provided by sensors of the transformer.

EP 2 600 510 A1 describes a method for controlling an electrical converter with power modules that can be heated to a target temperature by generating a circulating current through the power modules. An actual temperature of the power modules can be estimated based on a thermal model of the power modules and an ambient temperature.

AU 2013 260 082 A1 describes a method for reducing thermal cycling of a power switch in a power converter based on a junction temperature of the power switch. The junction temperature can be estimated based on an ambient temperature.

BRIEF DESCRIPTION

The present disclosure provides improved predictive maintenance of power semiconductor devices. The present disclosure also provides better prediction of temperature trends of a power semiconductor device.

A first aspect of the present disclosure relates to a method for predicting a faulty behaviour of an electrical converter. The method may be automatically performed by a controller of the electrical converter, for example as a software module stored in the controller.

According to an embodiment of the present disclosure, the method includes: receiving an operation point indicator of the electrical converter indicative of an actual operation point of the electrical converter; and receiving a measured device temperature of a power semiconductor device indicative of an actual temperature of the power semiconductor device.

The operation point of the electrical converter may be defined by the characteristics of the electrical converter at a specific time point. For example, the operation point may be defined by the current and/or the voltage processed by the electrical converter and/or by the output power of the electrical converter. The operation point indicator may be provided as a value or as a set of values. The operation point indicator may include one or more values and/or quantities, which are correlated with a temperature of the power semiconductor device.

The operation point indicator may be determined from quantities, measured in the electrical converter and/or produced by a controller of the electrical converter, which controls power semiconductor switches of the electrical converter.

The power semiconductor device may be a power semiconductor switch, for example an IGBT.

The measured temperature of the power semiconductor device may be provided as a value. The measure temperature may be measured with a temperature sensor attached to the power semiconductor device.

The operation point indicator and the measured device temperature may be determined over time, i.e. there may be an operation point indicator and a measured device temperature for a plurality of measurement steps. The one or more values of the operation point indicator may have to be sampled with a high enough frequency, as temperature changes may happen in matter of seconds. For example, the sampling frequency and/or the distance of consecutive measurement steps may be in a range between 0.1 s and 5 s.

According to an embodiment of the present disclosure, the method includes: inputting the operation point indicator as input data into a machine learning algorithm trained with historical data (or training data) including historical operation point indicators and associated historical device temperatures; and estimating an estimated device temperature with the machine learning algorithm.

An estimated device temperature of the power semiconductor device may be determined with a machine learning algorithm, which has been trained with historical data. Historical data may be data that has been recorded before the method is performed. The machine learning algorithm may be based on weights, which are adjusted during the training.

The weights may define a function into which the input data is input and which outputs the estimated device temperature.

It has been found by the applicant that quantities related to an operation point of an electrical converter, i.e. the operation point indicators, are suited for training a machine learning algorithm, which estimates a device temperature of a power semiconductor device of the electrical converter. This may be due to the fact that the operation point of the converter is correlated with the electrical stress on its power semiconductor device. A machine learning algorithm may be used for determining normal and faulty behaviour of a converter and detecting abnormalities. Troubleshooting the root cause can help in maintaining, prolonging lifetime, and preventing unexpected failures of drives.

Since the machine learning algorithm has been trained with historical data that was recorded during normal operation of a power semiconductor device, the estimated device temperature represents a device temperature during a normal operation, when the semiconductor device is in a good condition.

According to an embodiment of the present disclosure, the method further includes: predicting the faulty behaviour by comparing the estimated device temperature with the measured device temperature. The faulty behaviour may be provided as value, for example in one case as yes/no-value.

If the machine learning algorithm is trained well and the drive is constantly used as described by training data, there should be only small error between the estimated device temperature and the measured device temperature. Comparing these two values over time, an increasing temperature trend may be seen for the power semiconductor device, shown as difference between estimation and measurement. In particular, an increasing temperature trend may be assumed, when the measured device temperature is higher than the estimated temperature.

An increasing temperature trend usually is caused by a faulty behaviour of the power semiconductor device or other components of the electrical converter. For example, the power semiconductor device may be aged and may have an increased resistance. Other potential causes for a temperature increase may be blocked cooling filters or component aging of other parts of the converter.

The faulty behaviour may be the faulty behaviour of the power semiconductor device and/or of the electrical converter. With the outcome of the predication, unexpected failures and downtime may be reduced, safety may be increased and other parts of the converter also may be protected.

Using a machine learning algorithm for estimating a temperature, a meaningful and automated way of noticing an increasing temperature trend may be provided. The gained information may be used to notify which power semiconductor devices and/or which converter may be in need of maintenance and/or require a more detailed analysis to see if there is something wrong in a power semiconductor module.

According to an embodiment of the present disclosure, the input data of the machine learning algorithm includes the measured device temperature of a previous (measurement) time step and the operation point indicator of an actual time step and/or of the previous time step. Additionally to the operation point indicator also the measured device temperature, which has been measured in a previous time step, may be input to the machine learning algorithm. This may increase the accuracy of the prediction of the estimated temperature. In this case, the historical data used for training has to include, additionally, historical measured device temperatures. The actual time step may be the last time step at which the measurements have been performed, while the previous time step may be the second-to-last time step.

According to an embodiment of the present disclosure, the machine learning algorithm estimates the estimated temperature for the actual time step. As already mentioned, the measurements may be made regularly at measurement or sampling time steps. The input data may include values of the operation point indicator and optional measured temperature of at least one previous (measurement) time step. This may allow that a timely development of these quantities is considered.

According to an embodiment of the present disclosure, the input data includes measured device temperatures for a number of previous time steps. It also is possible that the input data includes operation point indicators for a number of previous time steps. In this case, the timely behaviour of the quantities may be considered by the machine learning algorithm directly.

In general, it may be that the input data includes the measured device temperature for solely one previous time step and the operation point indicator of solely one previous time step. It may be that the input data includes the measured device temperature for solely one previous time step and the operation point indicator of a number of previous time steps. It may be that the input data includes the measured device temperature for a number of previous time steps and the operation point indicator of solely one previous time step. It may be that the input data includes the measured device temperature for a number of previous time steps and the operation point indicator for a number of previous time steps.

According to an embodiment of the present disclosure, the input data includes one or more differences of the measured device temperatures for a number of previous time steps. The input into the machine learning algorithm may be one or more temperature differences between two consecutive temperature measurements. When using the absolute values of the temperature measurements as an input, the machine learning algorithm may learn to predict that the temperature on the next time step is the same as the temperature on the previous time step. When using the differences instead of the absolute values, the actual temperature value may be hidden, and the input and output parameters may be decoupled.

According to an embodiment of the present disclosure, the method further includes: receiving an ambient temperature of the converter, the ambient temperature being indicative of an ambient temperature of the power semiconductor device and/or the converter. The electrical converter and/or the controller may include an ambient temperature sensor. The ambient temperature may be a temperature of an interior of the converter, for example the temperature inside the housing of the converter.

According to an embodiment of the present disclosure, the input data of the machine learning algorithm includes, additionally, the ambient temperature. The ambient temperature may be used as further input data for the machine learning algorithm. This may improve the accuracy of the prediction of the estimated temperature, since the temperature of the power semiconductor device depends on the ambient temperature and the heat generated inside the power semiconductor device.

According to an embodiment of the present disclosure, the measured device temperature in the input data is provided relative to the ambient temperature. In other words, the ambient temperature may be subtracted from the measured device temperature, before the result is input into the machine learning algorithm.

According to an embodiment of the present disclosure, the estimated device temperature, which is output by the machine learning algorithm, is provided relative to the ambient temperature. It also may be that the output of the machine learning algorithm, i.e. the estimated temperature, is a relative value relative to the ambient temperature. This relative may be added to the ambient temperature to determine an absolute temperature value.

However, it also may be possible that one or more absolute values of the measured temperature are input into the machine learning algorithm and/or that the estimated temperature output by the machine learning algorithm is provided in absolute values. According to an embodiment of the present disclosure, the method further includes: determining a temperature error from a difference of the measured temperature and the estimated temperature, and comparing the temperature error with a threshold for predicting a faulty behaviour of the power semiconductor device. The temperature error may be an indicator for a faulty behaviour, since, when the measured temperature is much higher than the estimated temperature, the operation of the power semiconductor device and/or the converter is different from the one as shown by the historical data, which reflects a normal operation.

The temperature error may be averaged or a mean value may be determined for the temperature error. For example, a moving average error and/or a median error may be tracked to see when measured temperature values start to deviate from estimated temperature values. When the temperature error has reached a threshold and optionally stays above the threshold for a predefined time period, then a faulty behaviour may be predicted. It may be assumed that some change has happened in the converter system and a warning may be given, as well as instructions how to proceed.

According to an embodiment of the present disclosure, the machine learning algorithm has been trained with historical data of the same converter. It may be that the historical data is recorded during a commissioning phase of the converter, where normal operation may be assumed. This may be beneficial, since the data may be recorded for the same power semiconductor device, which are later supervised with the method.

According to an embodiment of the present disclosure, the machine learning algorithm has been trained with historical data of at least one different converter, which may have the same and/or a similar topology. In this case, a general temperature model may be present for all of the similar converters. A first collection of historical data from a new drive may be omitted, but instead the temperature behaviour may be directly monitored after installation.

However, it is also possible that a machine learning algorithm trained with historical data of different converters is additionally trained with historical data of the same converter. This may further improve the prediction results.

According to an embodiment of the present disclosure, the machine learning algorithm is an artificial neuronal network. The artificial neural networks typically may have three layers, such as an input layer, a hidden layer and an output layer. There may be multiple hidden layers (such as used in deep learning). For the present application, it has been shown that solely one hidden layer is required for acceptable performance.

According to an embodiment of the present disclosure, the operation point indicator includes at least one of: a converter current, a converter voltage, a switching frequency, a DC link voltage. All of these quantities are indicative of the amount of heat produced by the power semiconductor devices of the converter.

According to an embodiment of the present disclosure, the electrical converter is connected to a rotating electrical machine for driving the rotating electrical machine and the operation point indicator includes at least one of: a torque of the rotating electrical machine, a rotational speed of the rotating electrical machine. Drive parameters such as torque and rotational speed may be used as the input data to train a machine learning algorithm and to estimate the device temperature.

In general, other quantities may be considered as well as an operation point indicator, if they have a positive correlation with the device temperature and optionally are sampled with high enough frequency, such as more than one sample per second. The sampling frequency may be in a range between 0.1 s and 5 s.

A further aspect of the present disclosure relates to a computer program, which, when being executed by a processor, is adapted for performing the method as described in the above and the below, as well as to a computer-readable medium in which such a computer program is stored. A computer-readable medium may be a floppy disk, a hard disk, a USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the present disclosure relates to a controller of the electrical converter, which controller is adapted for performing the method as described in the above and in the below. The controller may include a processor and a memory and the method may be implemented as the computer program in the controller. The computer program may be stored as software module in the controller. It also may be that the controller is adapted for controlling the power semiconductor switches of the electrical converter. This task may be performed by a further software module stored in the controller.

A further aspect of the present disclosure relates to an electrical converter, which includes a plurality of power semiconductor devices and at least one temperature sensor arranged for measuring a device temperature of at least one of the power semiconductor devices. The plurality of the power semiconductor devices, which may include semiconductor switches, such as IGBTs, and optionally diodes, may be accommodated in one or more semiconductor modules. A semiconductor module may include a casing and/or wiring for mechanical supporting and/or electrically interconnecting one or more power semiconductor devices. Each of the modules also may include a temperature sensor for measuring the device temperature of the one or more semiconductor devices.

The power semiconductor devices may be connected into one or more half-bridges, which are interconnected to form a specific converter topology. The electrical converter may be interconnected between an electrical grid and a rotating electrical machine, such as a motor or generator.

The electrical converter furthermore may include a controller, which, as described in the above and in the following, is adapted for estimating the temperature of at least one of the power semiconductor devices.

It may be that the method is performed for one, some or all of the power semiconductor devices. For example, the method may be performed for at least one power semiconductor device per semiconductor module. When a faulty behaviour for the at least one power semiconductor device in a module is predicted, then this semiconductor module may be shut down and/or exchanged.

It has to be understood that features of the method as described in the above and in the following also may be features of the electrical converter, the computer program, computer-readable medium and the controller as described in the above and in the following, and vice versa.

These and other aspects of the present disclosure will be apparent from and elucidated with reference to the embodiments described hereinafter.

BRIEF DESCRIPTION OF THE DRAWINGS

The subject-matter of the present disclosure will be explained in more detail in the following text with reference to exemplary embodiments which are illustrated in the attached drawings.

FIG. 7 schematically shows a structure of a neural network trained to perform a temperature estimation in a method according to an embodiment of the present disclosure.

The reference symbols used in the drawings, and their meanings, are listed in summary form in the list of reference symbols. In principle, identical parts are provided with the same reference symbols in the figures.

DETAILED DESCRIPTION

Figure 1:
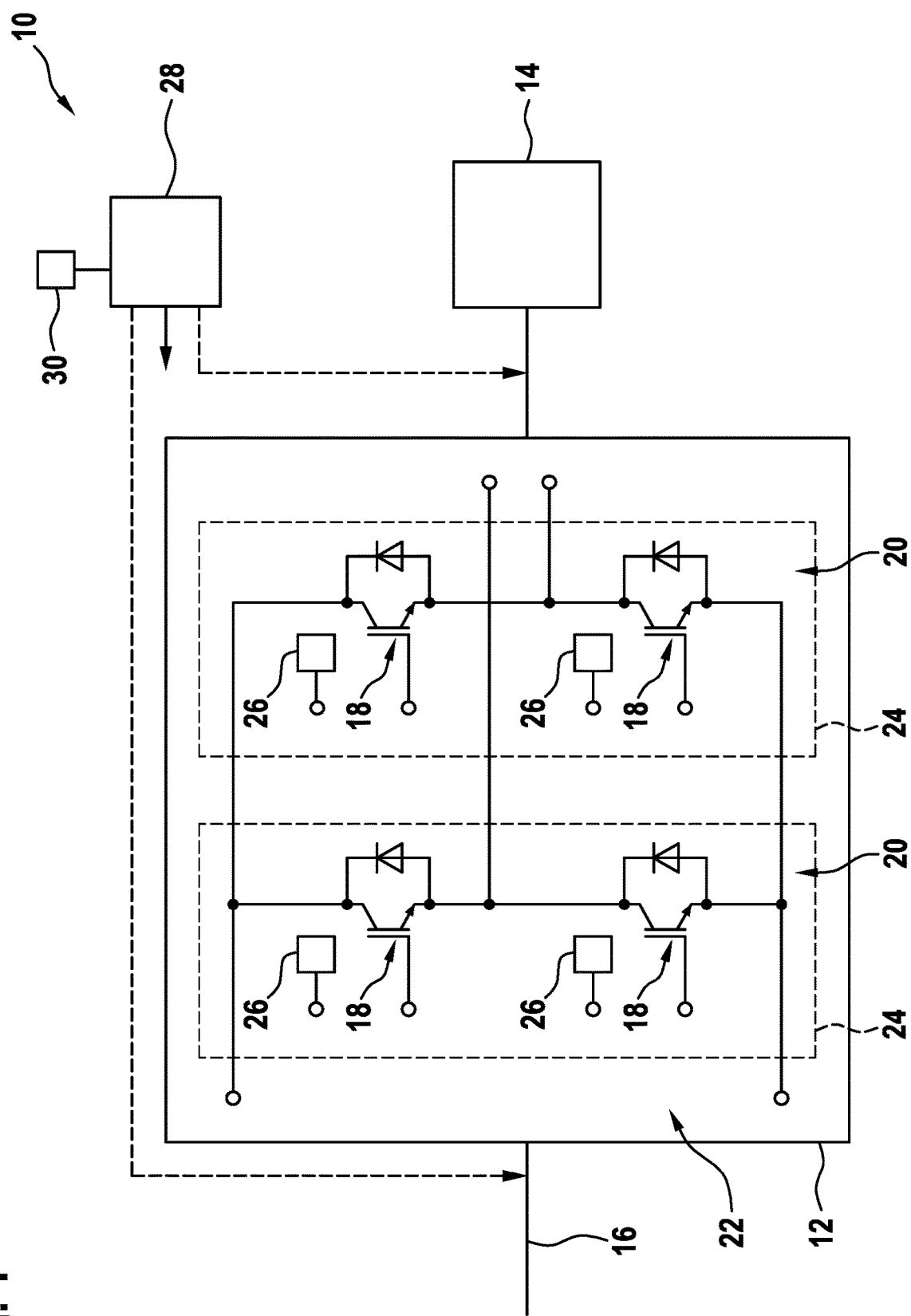
FIG. 1 schematically shows a drive system with an electrical converter according to an embodiment of the present disclosure.

FIG. 1 shows a drive system 10, which includes an electrical converter 12 and a rotating electrical machine 14, such as a motor or generator. The electrical converter 12 is connected to an electrical grid 16 and converts the grid voltage into an output voltage supplied to the rotating electrical machine 14.

As schematically shown in FIG. 1, the converter 12 includes power semiconductor devices 18, which may be semiconductor switches and in particular IGBTs. The freewheeling diodes connected in parallel to the semiconductor switches also may be considered as power semiconductor devices.

As shown, the power semiconductor devices 18 may be connected in series to form half-bridges 20, which may be connected to a DC link 22 and/or may provide a phase output between them. The power semiconductor devices 18 of one half-bridge may be assembled into a power semiconductor module 24.

For each power semiconductor device 18, a temperature sensor 26 may be present, which also may be assembled into the respective power semiconductor module 24. However, it is also possible that solely one temperature sensor 26 is present per power semiconductor module 24. With the temperature sensor 26, an actual device temperature of an associated power semiconductor device 18 can be measured.

The drive system 10 also includes a controller 28, which is adapted for controlling the converter 12 and, as indicated, the power semiconductor switches. To this end, gate signals for the power semiconductor switches may be generated by the controller 28. As indicated in FIG. 1, the controller 28 therefore may receive measurement signals from current and/or voltages in the converter 12, such as an input voltage, DC link voltage, output voltage, output current, etc.

Besides the control of the power and/or torque of the drive system 10, the controller 28 is also adapted for predicting faulty behaviour of the converter 12 and/or its power semiconductor devices 18 based on temperature measurements and estimations.

For this, the controller 28 is also adapted for receiving measurement signals from the temperature sensors 26. The converter 12 also may include an ambient temperature sensor 30, which may be provided in a housing of the converter 12. The controller 28 also may be adapted for receiving measurement signals from the ambient temperature sensor 30.

Figure 2:
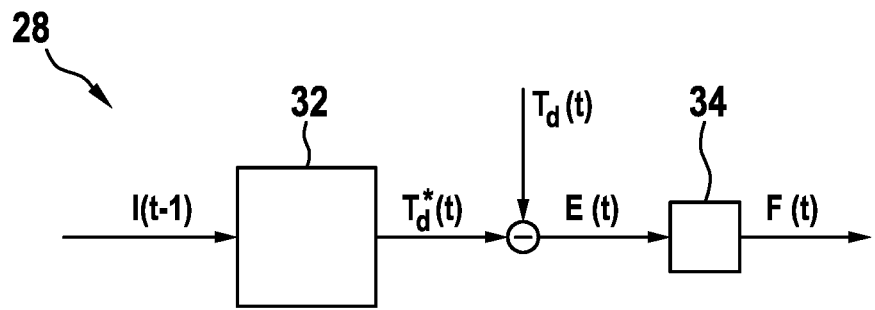
FIG. 2 shows a block diagram illustrating a method and a controller according to an embodiment of the present disclosure.
Figure 3:
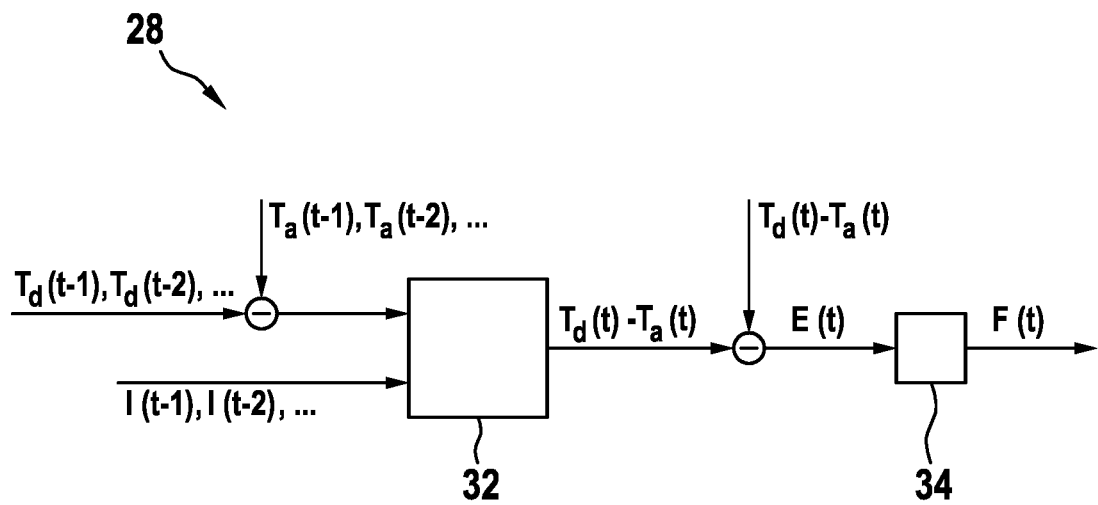
FIG. 3 shows a block diagram illustrating a method and a controller according to a further embodiment of the present disclosure.

FIGS. 2 and 3 show diagrams for parts of the controller 28, which may perform the prediction of the faulty behaviour. With respect to FIGS. 2 and 3, also a method for predicting a faulty behaviour of the electrical converter 12 is described.

The method and the controller 28 are based on a machine learning algorithm, which may be executed in module 32 shown in FIGS. 2 and 3.

As shown in FIG. 2, an operation point indicator I of the electrical converter 12, which is indicative of an actual operation point of the electrical converter 12, is input as input data into the machine learning algorithm 32. The operation point indicator I may include at least one of a converter current, a converter voltage, a switching frequency, a DC link voltage, a torque of the rotating electrical machine 14, a rotational speed of the rotating electrical machine 14, etc.

In general, the operation point indicator I may be any quantity positively correlated with the device temperature.

The operation point indicator I may be provided and/or determined by other control functions of the controller 28 and/or may be based on current and/or voltage measurement in the converter 12.

From the input data, the machine learning algorithm 32 estimates an estimated device temperature $T_d^*$. In general, the machine learning algorithm 32 may be a function with which the estimated device temperature $T_d^*$ can be calculated from the input data. The function may include parameters or weights, which have been adjusted during a training phase of the machine learning algorithm 32.

In particular, the machine learning algorithm 32 has been trained with historical data including operation point indicators I and associated device temperatures $T_d$, which have been recorded for the same converter 12 and/or from different converters, which may have been of the same type and/or topology. With the aid of the historical data, the parameters of weight of the machine learning algorithm 32 may be adjusted, such that the function outputs similar estimated device temperatures $T_d^*$ for similar input data.

For example, the historical data may be recorded at the beginning of lifetime of the power semiconductor devices 18 and may be used up to the end of the lifetime of these devices 18.

For example, the machine learning algorithm 32 may be an artificial neuronal network. It has been shown that in a simple artificial neuronal network with an input layer, solely one hidden layer and an output layer is enough to estimate the temperature with high accuracy.

Figure 4A:
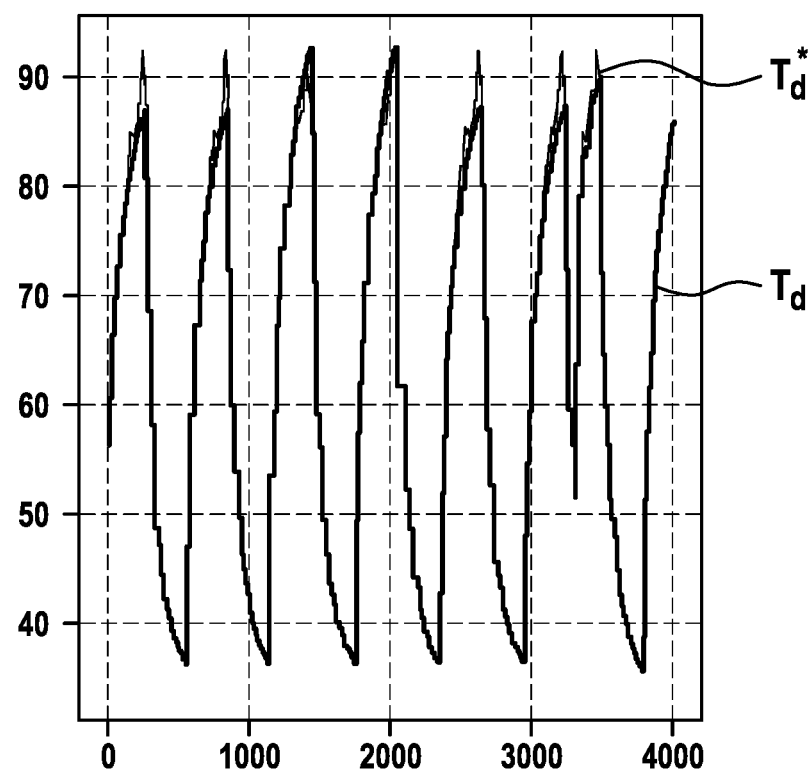
FIGS. 4A and 4B show diagrams with estimated and measured temperature of a power semiconductor device.

FIG. 4A shows the measured device temperature $T_d$ of an IGBT, which is part of a converter 12, and the estimated device temperature $T_d^*$ produced by such an artificial neuronal network, which has been trained accordingly. The temperature is depicted on the vertical axis in ° C. FIG. 4A has been produced for a set of sample time steps, depicted to the right, at the beginning of the lifetime of the IGBT.

Figure 4B:
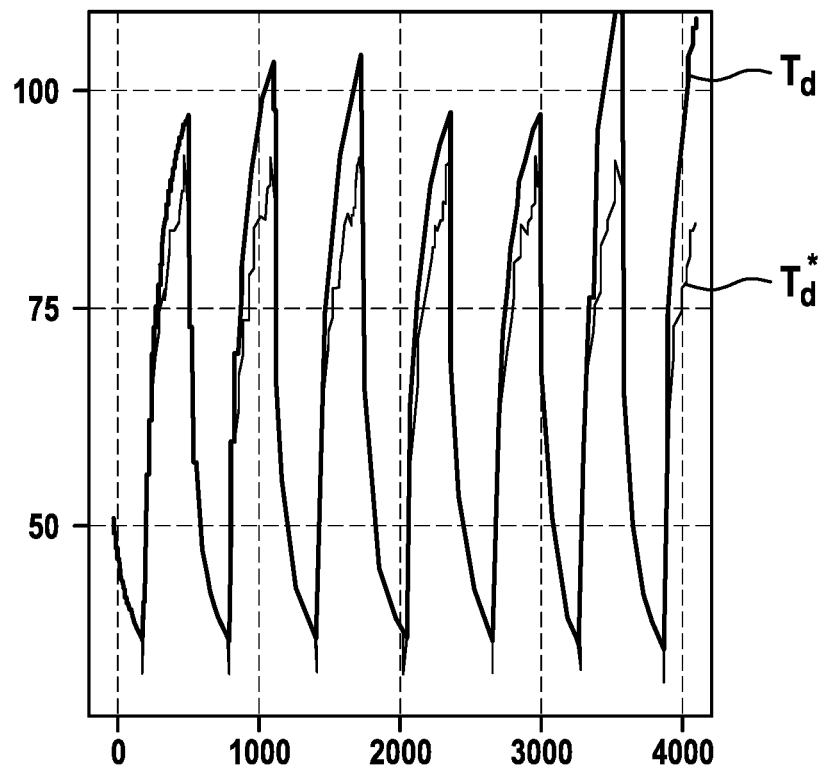

FIG. 4B is a similar diagram as FIG. 4A, however with the measured device temperature $T_d$ and the estimated device temperature $T_d^*$ at the end of the lifetime of the IGBT. As the artificial neural network was trained with normal data, it cannot correctly predict the elevated temperatures at the end of the lifetime. The higher measured device temperatures $T_d$ can be clearly seen in FIG. 4B. The difference between estimation and measurement is clearly visible, showing that the temperature behaviour has changed when compared to training data, which was accumulated at the beginning of the lifetime. This error may be monitored, for example with a moving error index.

Returning to FIG. 2, the input data of the machine learning algorithm 32 may include the measured device temperature $T_d(t-1)$ of the previous sampling and/or measurement time step t-1 and the operation point indicator I(t-1) of the previous time step t-1. It also may be that the operation point indicator I(t) of the actual time step t is additionally or alternatively included into the input data. The machine learning algorithm 32 then may estimate the estimated device temperature $T_d^*(t)$ for the actual time step t.

By subtracting the actual measured device temperature $T_d(t)$ at the actual time step t from the actual estimated device temperature $T_d^*(t)$, a temperature error E(t) at the actual time step t may be determined, which is input into an averaging and/or comparator module 34.

The averaging and/or comparator module 34 may average the temperature error E over a time horizon of a plurality of time steps. The result may be compared with a threshold and, if the averaged error is higher than the threshold, the faulty behaviour signal F may be changed to 1. Otherwise, the faulty behaviour signal F may be 0.

It has to be noted that alternatively, a median error E(t) may be determined by the averaging and/or comparator module 34 from the measured device temperature $T_d$ at the end from the estimated device temperature $T_d^*$.

In FIG. 3 it is shown that the input data for the machine learning algorithm 32 may include operation point indicators I(t-1), I(t-2), ... for a number of previous time steps t-1, t-2, etc. By using more than one previous operation point indicator I, the accuracy of the machine learning algorithm 32 may be enhanced. It has to be noted that in FIG. 3, also the operation point indicator I(t) of the actual time step t may be included into the input data.

FIG. 3 also shows that the measured device temperature $T_d(t-1)$ of the previous time step may be part of the input data. It also may be that the input data for the machine learning algorithm 32 includes measured device temperatures $T_d(t-1)$, $T_d(t-2)$, ... for a number of previous time steps t-1, t-2, etc. Again, this may enhance the prediction accuracy.

When an ambient temperature $T_a$ is measured, also the ambient temperature $T_a(t-1)$ of the previous time steps and optionally for a number of previous time steps may be included into the input data.

It also may be that the input data includes differences of the measured device temperatures ($T_d(t)-T_d(t-1)$, $T_d(t-1)-T_d(t-2)$, ...) for a number of previous time steps t-1, t-2, .... As shown in FIG. 3, the estimation performed by the machine leaning algorithm 32 may be performed relative to the ambient temperature $T_a$. The ambient temperature $T_a$ may be subtracted from the measured device temperature $T_d$, before it is input into the machine learning algorithm 32. The machine learning algorithm then estimates the device temperature relative to the ambient temperature $T_a$, i.e. outputs $T_d^*-T_a$. It has to be noted that then for determining the temperature error E, also the relative measured temperature $T_d-T_a$ has to be subtracted.

Figure 5A:
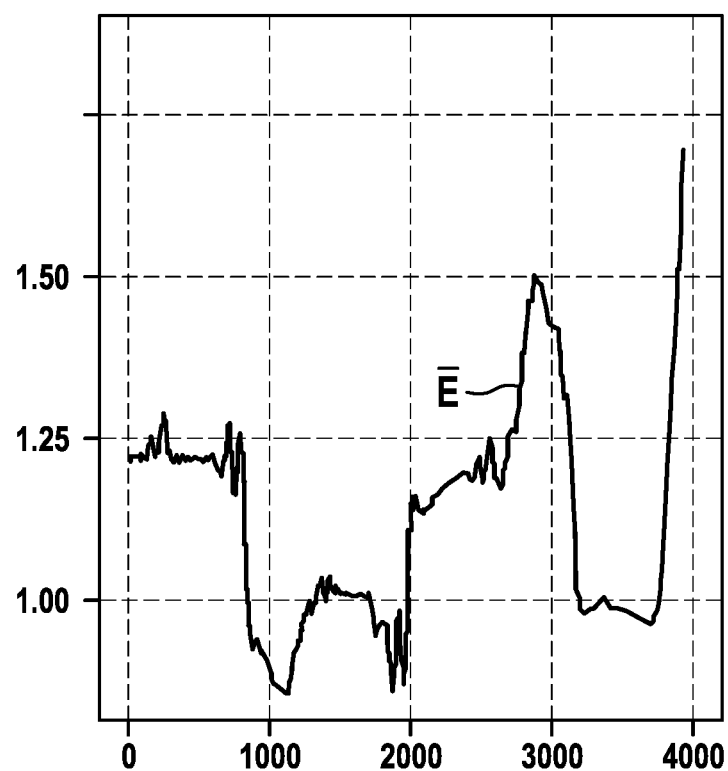
FIGS. 5A, 5B, 6A, and 6B show diagrams with temperature errors as determined with a method according to an embodiment of the present disclosure.
Figure 5B:
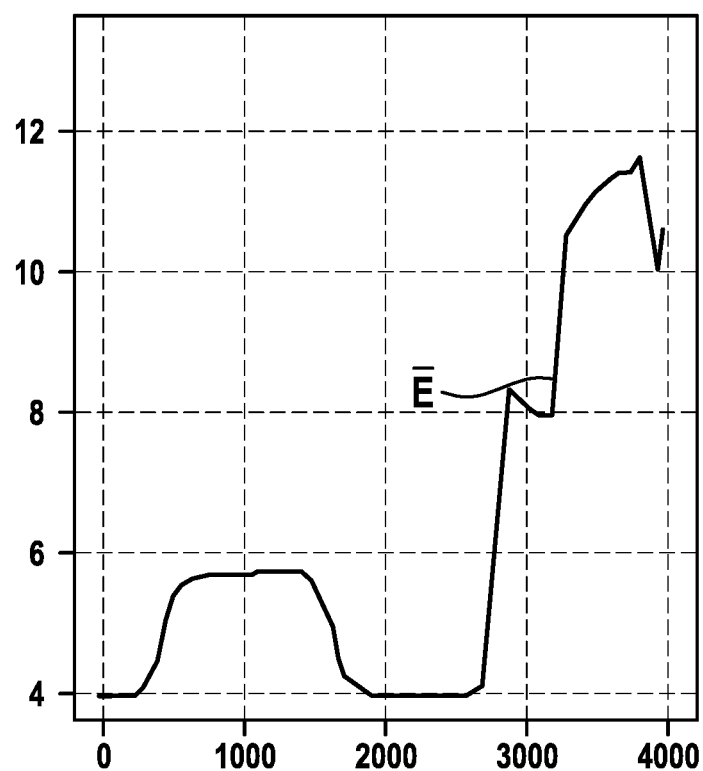

FIGS. 5A and 5B show the moving average $\bar{E}$ of the temperature error E at the beginning and the end of the lifecycle of an IGBT, respectively. Note that the error, which is depicted on the vertical axis, is shown to the value of 2 in FIG. 5A and to the value of 12 in FIG. 5B. The sampling time steps are shown on the horizontal axis.

Figure 6A:
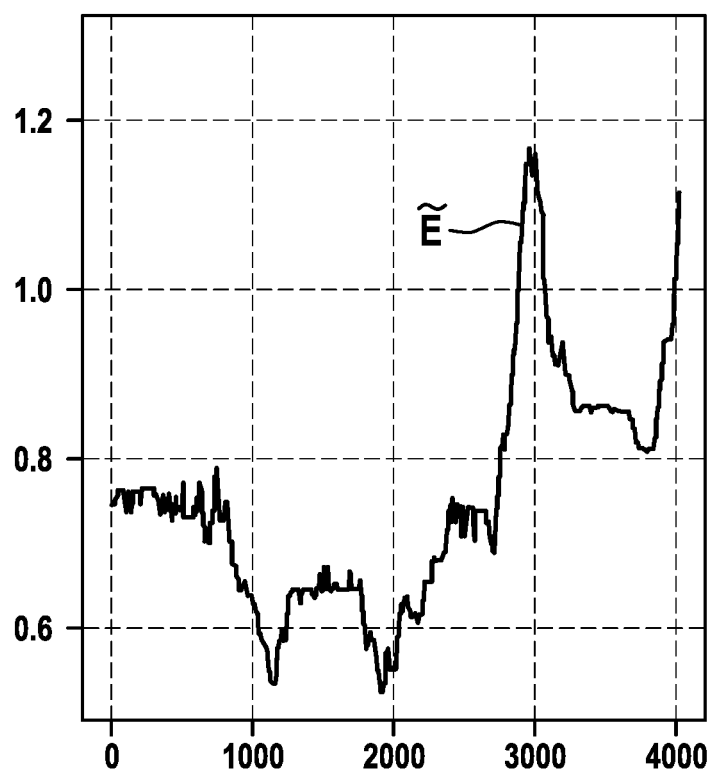
Figure 6B:
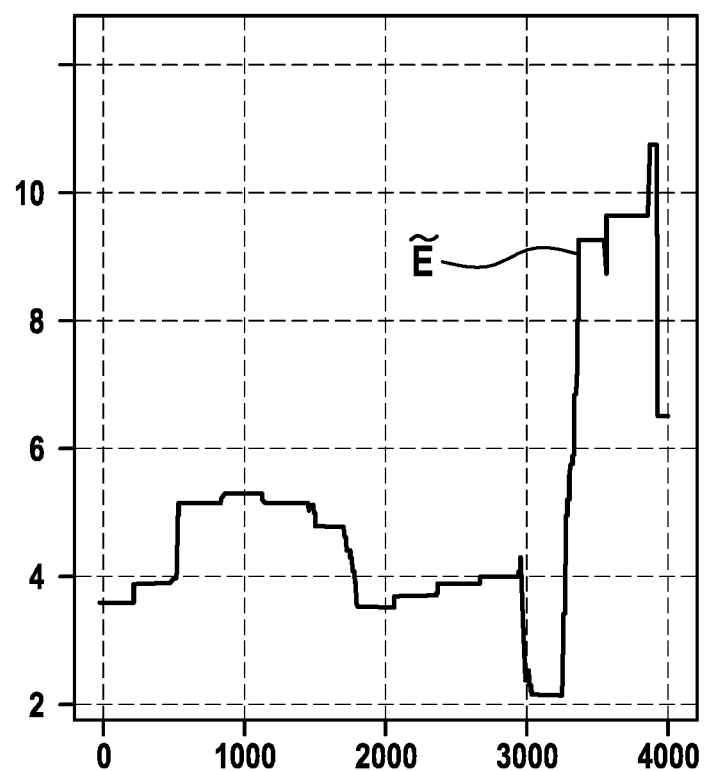

FIGS. 6A and 6B are analogously diagrams, however with the median error $\tilde{E}$.

As can be seen from FIGS. 5A and 5B or from FIGS. 6A and 6B, a threshold may be used for the temperature error E, $\bar{E}$, $\tilde{E}$ to trigger the fault behaviour signal F and to generate a warning about a change in temperature behaviour.

As can be seen, the temperature error E, $\bar{E}$, $\tilde{E}$ is smaller than 2 at the beginning of the lifecycle. In the end of the lifecycle, it is consistently higher than 4 and may reach values higher than 10 briefly. After the temperature error E, $\bar{E}$, $\tilde{E}$ has been over the threshold for a certain amount of time, the faulty behaviour signal may be triggered and/or a warning about elevated temperatures in a power semiconductor module 24 may be generated. This may be done, even though no overtemperature fault has been triggered up so far. Once a warning has been triggered, troubleshooting may begin to find causes for the faulty behaviour, potentially preventing sudden breakdown or malfunction in the future.

The following table includes a sample of testing results output by a neural network for implementing the machine learning algorithm 32. The testing was done with Azure Machine Learning Studio, as it provided easy access to stored drive data as well as to suitable machine learning libraries. In this example, data sets of torque values "Torq15" to "Torq20", indicative of a torque of the electrical machine 14, are used as input data for training the neural network to estimate an IGBT case temperature. The column "Scored Labels" includes the corresponding output data of the neural network, i.e. the estimated values given by the neural network. The column "$T_C$" includes measured temperature values for each of the estimated values. As can be seen, there are only minor differences between the estimated and the measured values. Alternatively or additionally to the torque, rotational speed of the electrical machine 14 or ambient temperature may be used as input data for the neural network.

| Torq15 | Torq16 | Torq17 | Torq18 | Torq19 | Torq20 | $T_C$ | Scored Labels |
|---|---|---|---|---|---|---|---|
| 11.264338 | 8.273571 | 9.914753 | 7.426168 | 8.828226 | 8.279785 | 50.569656 | 49.605255 |
| 30.690624 | 29.400188 | 30.600868 | 31.13504 | 30.264393 | 32.505112 | 47.373535 | 46.880524 |
| 3.79306 | 2.82437 | 3.396286 | 3.914578 | 3.396516 | 1.162935 | 44.121147 | 44.138519 |
| 4.797654 | 4.65082 | 4.638852 | 4.673374 | 4.664399 | 4.6812 | 45.169472 | 46.162163 |
| 33.21373 | 23.269291 | 17.212269 | 10.196453 | 39.360283 | 48.53212 | 47.277687 | 51.551109 |
| 10.339146 | 8.930412 | 11.256973 | 22.446514 | 29.334827 | 41.16832 | 48.744202 | 48.193192 |
| 1.630135 | 1.568225 | 1.602057 | 1.678696 | 1.641412 | 1.582724 | 43.903473 | 43.640587 |

FIG. 7 schematically shows a structure of the above mentioned neural network. The neural network has an input layer 36 with multiple torque input neurons T for inputting the torque values and multiple rotational speed input neurons n for inputting rotational speed values and an output layer 37 with one output neuron for outputting the corresponding estimated value of the temperature. In this example, the input layer 36 and the output layer 37 are interconnected via one hidden layer 38 and ten previous samples from each signal have been used for estimating the temperature.

While embodiments of the present disclosure have been illustrated and described in detail in the drawings and foregoing description, such illustration and description are to be considered illustrative or exemplary and not restrictive. The present disclosure is not limited to the disclosed embodiments. Other variations to the disclosed embodiments can be understood and effected by those skilled in the art from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 drive system
12 electrical converter
14 rotating electrical machine
16 electrical grid
18 power semiconductor device
20 half-bridge
22 DC link
24 power semiconductor module
26 device temperature sensor
28 controller
30 ambient temperature sensor 30
32 machine learning algorithm/module
34 averaging and/or comparator module
36 input layer
37 output layer
38 hidden layer
n rotational speed input neuron
t actual time step
t-1, t-2 previous time steps
I operation point indicator
T torque input neuron
$T_d$ measured device temperature
$T_d^*$ estimated device temperature
$T_a$ ambient temperature
E error
F fault signal
$\bar{E}$ moving average error
$\tilde{E}$ median error

The invention claimed is:

1. A method for predicting a faulty behaviour of an electrical converter, the method comprising:
receiving an operation point indicator (I) of the electrical converter indicative of an actual operation point of the electrical converter, wherein the electrical converter is connected to a rotating electrical machine to drive the rotating electrical machine, and wherein the operation point indicator (I) comprises at least one of: a torque of the rotating electrical machine and a rotational speed of the rotating electrical machine;
receiving a measured device temperature ($T_d$) of a power semiconductor device of the electrical converter indicative of an actual temperature of the power semiconductor device;
inputting the operation point indicator (I) as input data into a machine learning algorithm trained with historical data comprising operation point indicators and associated device temperatures, wherein the historical data was recorded during normal operation of a power semiconductor device;
estimating an estimated device temperature ($T_d^*$) with the machine learning algorithm, wherein the estimated device temperature ($T_d^*$) represents a device temperature during a normal operation; and
predicting the faulty behaviour (F) by comparing the estimated device temperature ($T_d^*$) with the measured device temperature ($T_d$).

2. The method of claim 1,
wherein the input data of the machine learning algorithm comprises the measured device temperature ($T_d$(t-1)) of a previous time step and the operation point indicator (I(t)) of an actual time step; and
wherein the machine learning algorithm estimates the estimated device temperature ($T_d^*$(t)) for the actual time step.

3. The method of claim 1,
wherein the input data comprises measured device temperatures ($T_d$(t-1), $T_d$(t-2), . . . ) for a number of previous time steps; and/or
wherein the input data comprises operation point indicators (I(t-1), I(t-2), . . . ) for a number of previous time steps; and/or
wherein the input data comprises one or more differences of the measured device temperatures ($T_d$(t)-$T_d$(t-1), (t-1)-$T_d$(t-2), . . . ) for a number of previous time steps.

4. The method of claim 1, further comprising:
receiving an ambient temperature ($T_a$) of the electrical converter, the ambient temperature ($T_a$) indicative of an ambient temperature of the power semiconductor device and/or the electrical converter; and/or wherein the input data of the machine learning algorithm further comprises the ambient temperature ($T_a$).

5. The method of claim 4, wherein the input data of the machine learning algorithm further comprises the measured device temperature ($T_d$);

wherein the measured device temperature ($T_d$) in the input data is provided relative to the ambient temperature ($T_a$); and wherein the estimated device temperature ($T_d^*$), which is output by the machine learning algorithm, is provided relative to the ambient temperature ($T_a$).

6. The method of claim 1, further comprising:

determining a temperature error (E) from a difference of the measured device temperature ($T_d$) and the estimated device temperature ($T_d^*$); and comparing the temperature error (E) with a threshold for predicting the faulty behaviour (F).

7. The method of claim 1, wherein the machine learning algorithm has been trained with the historical data of the same converter; and/or wherein the machine learning algorithm has been trained with the historical data of at least one different converter.

8. The method of claim 1, wherein the machine learning algorithm is an artificial neuronal network.

9. The method of claim 1, wherein the operation point indicator (I) comprises at least one of (a) the torque of the rotating electrical machine and the rotational speed of the rotating electrical machine, and at least one of (b):

a converter current, a converter voltage, a switching frequency, and a DC link voltage.

10. The method of claim 1, wherein the power semiconductor device is a power semiconductor switch; and/or wherein the power semiconductor device is an IGBT.

11. A non-transitory computer-readable medium, which, when executed by a processor, is adapted to perform the method of claim 1.

12. A controller of an electrical converter adapted to perform the method of claim 1.

13. An electrical converter, comprising:

a plurality of power semiconductor devices;

at least one temperature sensor arranged to measure a device temperature ($T_d$) of at least one of the power semiconductor devices; and a controller according to claim 12, adapted to estimate the estimated device temperature ($T_d^*$) of the at least one of the power semiconductor devices and to predict the faulty behaviour (F).

* * * * *